(12) United States Patent
Taguchi

(10) Patent No.: US 7,677,578 B2
(45) Date of Patent: Mar. 16, 2010

(54) SEAL STRUCTURE

(75) Inventor: Arata Taguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 478 days.

(21) Appl. No.: 11/362,827

(22) Filed: Feb. 28, 2006

(65) Prior Publication Data

US 2006/0202432 A1  Sep. 14, 2006

(30) Foreign Application Priority Data

Mar. 9, 2005  (JP)  ............................. 2005-065350

(51) Int. Cl.
*F02F 11/00* (2006.01)
(52) U.S. Cl. ....................................... 277/592; 277/598
(58) Field of Classification Search ......... 277/591–592, 277/598
See application file for complete search history.

(56) References Cited

U.S. PATENT DOCUMENTS 4,832,349 A  5/1989  Kawai et al.

FOREIGN PATENT DOCUMENTS

| EP | 1 235 008 A2 | 8/2002 |
| EP | 1 522 769 A1 | 4/2005 |
| JP | 11-173424 A | 6/1999 |
| JP | 11336907 A * | 12/1999 |
| JP | 2004-68672 A | 3/2004 |
| JP | 2005-114113 A | 4/2005 |
| JP | 2005-233222 A | 9/2005 |

* cited by examiner

*Primary Examiner*—Vishal Patel
(74) *Attorney, Agent, or Firm*—Foley & Lardner LLP

(57) ABSTRACT

A seal structure includes a first member including a first joint surface and a flat third joint surface; a second member including a second joint surface joined with the first joint surface, a flat fourth joint surface; and a third member including a fifth joint surface joined, through a liquid seal, with the flat third and fourth joint surfaces. At least the second member includes a recessed portion. The fifth joint surface includes a flat region and a chamfered region which is recessed from the flat region and which confronts the recessed portion.

17 Claims, 6 Drawing Sheets

SEAL STRUCTURE

BACKGROUND OF THE INVENTION

The present invention relates to a seal structure. In particular, the present invention relates to a seal structure of three or more members joined together with the interposition of seal layer such as a layer of liquid gasket.

Published Japanese Patent Application Publication No. H11(1999)-173424 shows a seal structure using a sealing agent (liquid gasket) between flanges of two members designed to reduce a hardening time of the seal agent.

SUMMARY OF THE INVENTION

However, the seal structure of the above-mentioned Japanese patent document tends to be insufficient in strength against a relative displacement (specifically in a shearing direction) between the flanges because the liquid gasket is dispersed into two portions for accumulating or collecting the liquid gasket.

The inventor of the present application has proposed a seal structure designed to reduce the hardening time of liquid gasket between two members, and to improve the sealing performance with a smaller amount of the liquid gasket (EP 1 522 769A1 published on Apr. 13, 2005≈JP 2005-114113A published on Apr. 28, 2005). However, this seal structure proposed earlier is not necessarily satisfactory when applied to a three member joint structure.

It is an object of the present invention to provide a seal structure to improve sealing properties especially for a joint portion at which three members are joined together.

According to one aspect of the invention, a seal structure comprises: a first member including a first joint surface and a flat third joint surface forming a corner with the first joint surface; a second member joined with the first member, the second member including a second joint surface joined with the first joint surface of the first member, a flat fourth joint surface forming a corner with the second joint surface, and a recessed portion formed in the corner between the second and fourth joint surfaces; and a third member joined with the first and second members, the third member including a fifth joint surface joined, through a liquid seal, with the flat third joint surface of the first member and the flat fourth joint surface of the second member, the fifth joint surface including a flat region and a chamfered region which is recessed from the flat region of the fifth joint surface and which confronts the recessed portion of the second member.

According to another aspect of the present invention, a seal structure comprises: a first member including a flat first joint surface and a flat third joint surface; a second member joined with the first member, the second member including a flat second joint surface joined with the first joint surface of the first member, and a flat fourth joint surface; a third member joined with the first and second members, the third member including a flat fifth joint surface which extends along the third joint surface and the fourth joint surface of the first and second members, and which is joined with the third and fourth joint surfaces of the first and second members; and a seal member. The seal member includes: a first seal section which is interposed between the first and second joint surfaces of the first and second members; a second seal section extending along the fifth joint surface and including a first segment interposed between the fifth joint surface and the third joint surface of the first member, a second segment interposed between the fifth joint surfaced and the fourth joint surface of the second member, and an intermediate portion located between the first and second segments; and a third seal section bulging from the intermediate portion of the second seal section, and connecting with the first seal section.

BRIEF DESCRIPTION OF THE DRAWINGS

FIG. 10B shows a comparative example.

DETAILED DESCRIPTION OF THE INVENTION

Figure 1:
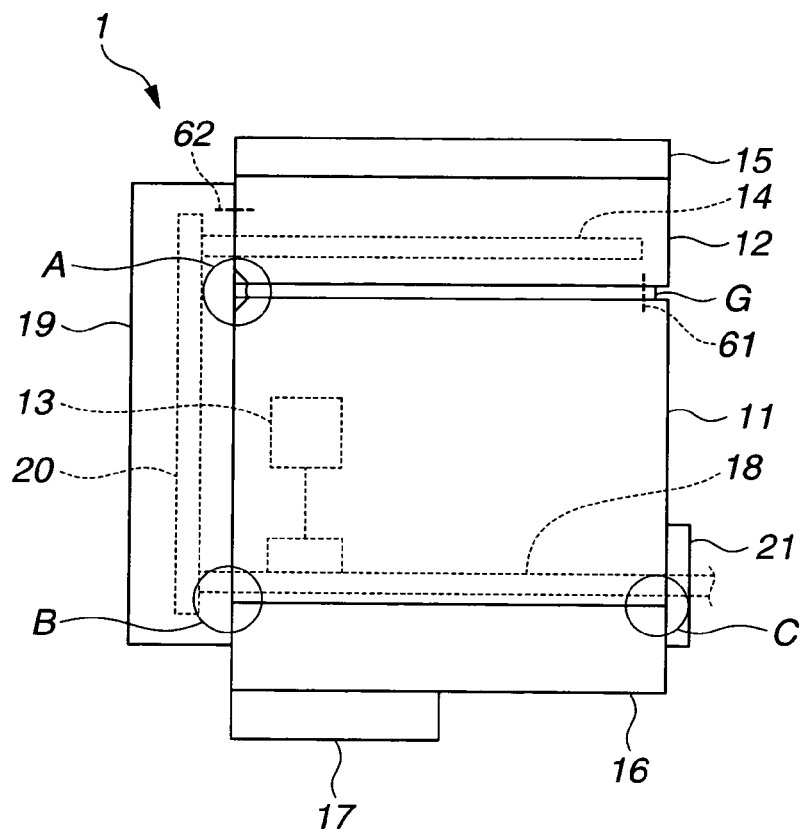
FIG. 1 is a schematic view showing an engine including a seal structure according to one embodiment of the present invention.

FIG. 1 schematically shows an internal combustion engine 1 having a seal structure according to a first embodiment of the present invention. In this example, a front side of engine 1 is located on the left side and a rear side is on the right side, as viewed in FIG. 1.

Engine 1 includes a cylinder block 11 and a cylinder head 12 which is fixedly mounted on the top of cylinder block 11. Cylinder block 11 is formed with cylinder bores each receiving a piston 13 forming a combustion chamber between the piston and the cylinder head 12. A camshaft 14 is rotatably supported on cylinder head 12. A head cover (or rocker cover) 15 is fixed to cylinder head 12 to cover the top of cylinder head 12. An upper oil pan 16 is fixed to the bottom of cylinder block 11 through a sealing material such as a liquid gasket. A lower oil pan 17 is fixed to the bottom of upper oil pan 16, and arranged to store a lubricating oil for engine 1. Cylinder block 11 and upper oil pan 16 form a crankcase in which a crankshaft 18 is supported.

A front cover 19 is fixed to the front sides of cylinder block 11, cylinder head 12 and upper oil pan 16, and arranged to cover a chain 20 for transmitting rotation from crankshaft 18 to camshaft 14. In this example, front cover 19 is a single integral (jointless) member. However, it is optional to employ a front cover composed of upper and lower members joined together. Head cover 15 and front cover 19 are designed to protect the inside of the engine such as the inside cavity of cylinder block 11, cylinder head 12, upper oil pan 16 or lower oil pan 17 to close the inside from the outside and to prevent leakage of oil.

A sealing layer of hardened liquid gasket g is formed for sealing between front cover 19 and an engine block formed by cylinder block 11 and cylinder head 12. The sealing layer is formed or filled in a hollow portion defined by one or more recessed portions such as chamfered portion. In this example, cylinder block 11 serves as a first member (or second member); cylinder head 12 serves as a second member (or first member); and front cover 19 serves as a third member.

Figure 2:
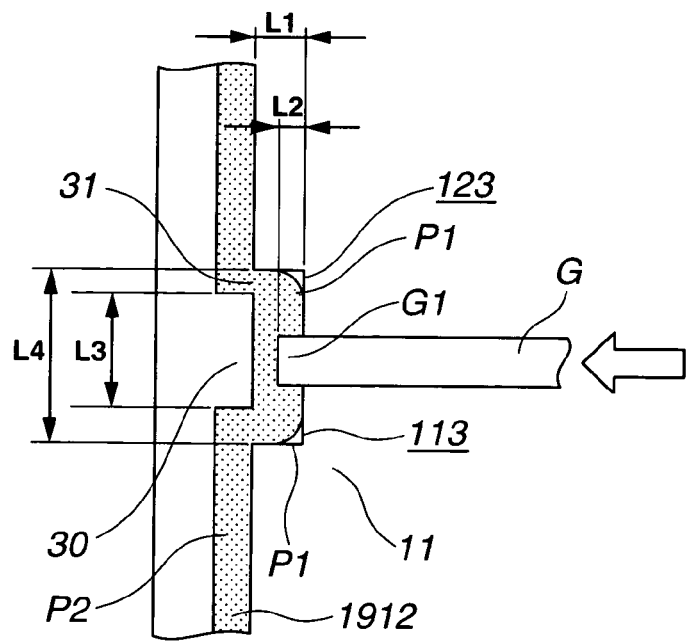
FIG. 2 is a view of a portion A of the engine shown in FIG. 1, as viewed from a direction F2 shown in FIG. 4.
Figure 4:
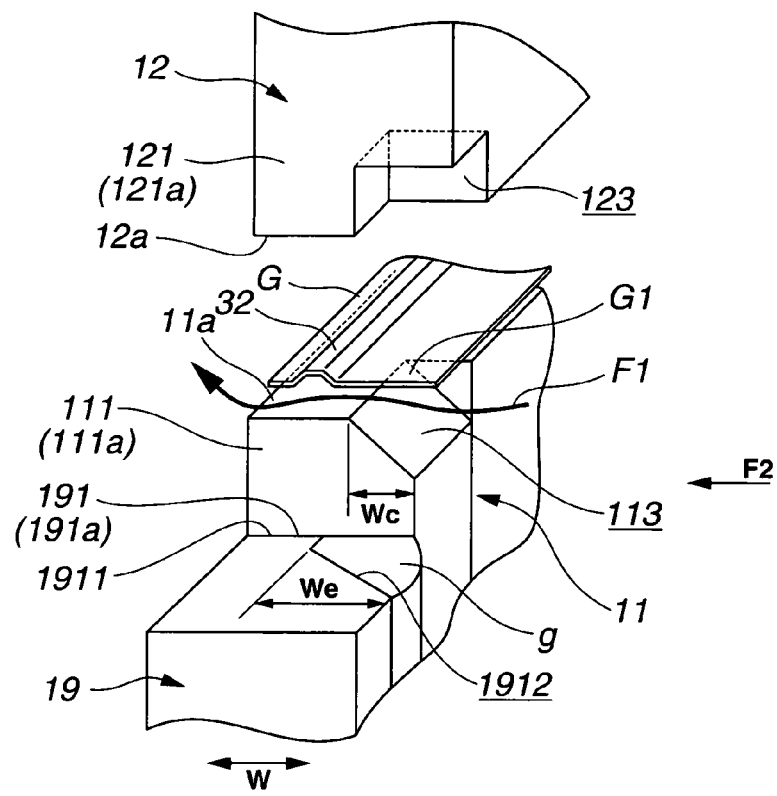
FIG. 4 is an enlarge view showing the portion of FIG. 3.

FIG. 2 shows a sealed joint portion A shown in FIG. 1, as viewed from a direction F2 shown in FIG. 4. Cylinder head 12 is fixed, through a sheet gasket G, with the top surface of cylinder block 11. Front cover 19 is fixed, through liquid gasket g, with the front surfaces of cylinder block 11 and cylinder head 12.

Figure 3:
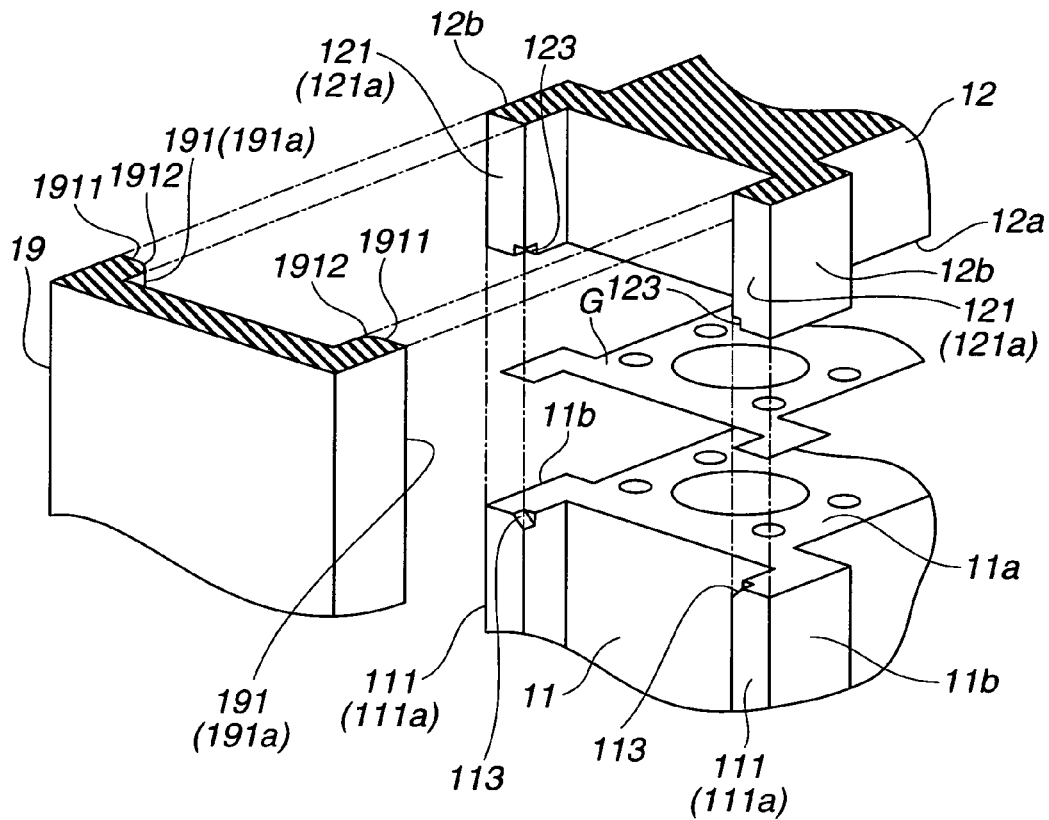
FIG. 3 is a schematic exploded perspective view showing a seal structure in the portion of FIG. 2 in which a cylinder block, a cylinder head and a front cover meet.

FIG. 3 schematically shows the sealed joint portion of FIG. 2 in perspective in an exploded form. Cylinder block 11 includes a flat top block surface 11a (serving as a first joint surface (or second joint surface)). Cylinder head 12 includes a flat head bottom surface 12a (serving as a second joint surface (or first joint surface)). Solid sheet gasket G is sandwiched between the flat top surface 11a of cylinder block 11 and the flat bottom surface 12a of cylinder head 12. Cylinder block 11 and cylinder head 12 are joined together to form the single engine block, by fastening devices such as bolts 61 (only one is schematically shown), with the horizontally placed sheet gasket G between the cylinder block 11 below and the cylinder head 12 above. j0017

FIG. 4 schematically shows the ternary sealed joint structure of the three members 11, 12 and 19 in the exploded state in which front cover 19 is broken away. Cylinder block 11 includes left and right front block flanges 111 projecting forwards, respectively, from the left front corner and the right front corner of cylinder block 11 shaped like a rectangular parallelepiped. Cylinder head 12 includes left and right front head flanges 121 projecting forwards, respectively, from the left front corner and the right front corner of cylinder head 12 shaped like a relatively short rectangular parallelepiped less tall than cylinder block 11. Each of block flanges 111 has a flat flange end surface 111a, and each of head flanges 121 has a flat flange end surface 121a. On each of the left and right sides, the flat flange end surface 111a and the flat flange end surface 121a are vertical and flush with each other so as to serve as third and fourth joint surfaces to be joined with front cover 19.

The flat flange end surface 11a of each block flange 111 and the flat top surface 11a of cylinder block 11 meet together at a straight front upper edge extending horizontally (in the correct upright position of the engine block, to be exact) from an outer end point to an inner end point of the block flange 111, and these surfaces 111a and 11a form an angle which is substantially equal to 90°. As shown in FIGS. 3 and 4, a cylinder block recessed portion 113 is formed in an angled corner formed between the vertical flange end surface 111a and the horizontal block top surface 11a in each of the left and right block flanges 111. This recessed portion 113 can be also called beveled portion or cutout portion. Cylinder block recessed portion 113 is recessed rearwards so as to increase a spacing from a corresponding cover flange end surface 191a. As shown in FIG. 4, the recessed portion 113 of this example is formed by a sloping surface on the inner side of block flange 111.

The cylinder block recessed portion 113 of this example is formed on the inner side of each block flange 111 at a position confronting a corresponding recessed portion (or chamfered portion) 1912 formed in front cover 19. Each block flange 111 of this example includes a flat outer flange side surface and a flat inner flange side surface which are spaced apart in a widthwise direction W of the flange, that is a lateral direction or left and right direction of cylinder block 11. The flat flange end surface 111a is bounded between the outer and inner flange side surfaces. The inner flange side surfaces of the left and right front block flanges 111 confront each other whereas the outer flange side surfaces face away from each other. The flange side surfaces of the left and right block flanges 111 of this example are parallel to one another, and all extend in a longitudinal direction of cylinder block 11, that is a front and rear direction. In each block flange 111, the recessed portion 113 is in the form of a cutout formed by cutting off the apex formed by the flange end surface 111a, the flange inner side surface and the block top surface 11a. In this example, as shown in FIG. 4, recessed portion 113 is defined by the sloping or slant surface sloping down from the block top surface 11a to the inner flange side surface in the widthwise direction W. The (widthwise) direction W is perpendicular to the joining direction of the (first and second) joint surfaces (11a and 12a), and perpendicular to a normal to the flange end surface 111a. The joining or fastening direction of the joint surfaces 11a and 12a is a direction which is vertical, and perpendicular to the joint surfaces 11a and 12a. Bolts 61 extends in this joining direction. Each block recessed portion 113 of cylinder block 11 and the corresponding recessed (chamfered) portion 1912 of front cover 19 form a hollow portion therebetween, serving as a collector portion p1 for collecting liquid gasket g, as shown in FIG. 2. Accordingly, it is desirable to determine the shape and dimensions of the cylinder block recessed portion 113 in consideration of a desired quantity of liquid gasket g.

Cylinder head 12 includes left and right front head flanges 121, and each head flange 121 has a flat flange end surface 121a, like cylinder block 11, as mentioned before. The flat flange end surface 121a of each head flange 121 and the flat bottom surface 12a of cylinder head 12 meet together at a straight front lower edge extending horizontally (in the correct upright position of the engine block, to be exact) from an outer end point to an inner end point of the head flange 121, and these surfaces 121a and 12a form an angle which is substantially equal to 90°. As shown in FIGS. 3 and 4, a cylinder head recessed portion 123 (or beveled or cutout portion) is formed in an angled corner formed between the vertical flange end surface 121a and the horizontal head bottom surface 12a in each of the left and right head flanges 121. Cylinder head recessed portion 123 is recessed rearwards so as to increase a spacing from the corresponding cover flange end surface 191a of front cover 19 like the cylinder block recessed portions 113. As shown in FIG. 4. cylinder head recessed portion 123 is in the form of a cutout shaped like a rectangular parallelepiped (or cuboid). However, it is optional to shape each of the cylinder head recessed portions 123 into a form defined by a sloping surface like a mirror image of the cylinder block recessed portion 113 shown in FIG. 4.

In the assembled state, on each of the left and right sides, the cylinder head flange 121 is aligned vertically with the block flange 111, and the block flange end surface 111a and head flange end surface 121a are even and flush with each other in the same plane.

The cylinder head recessed portion 123 of this example is formed on the inner side of each head flange 121 at a position confronting the corresponding recessed portion (or chamfered portion) 1912 formed in front cover 19. Like the block flanges 111, each head flange 121 of this example includes a flat outer flange side surface and a flat inner flange side surface which are spaced apart in the widthwise direction W of the flange, that is the lateral direction of cylinder head 12. The flat flange end surface 121a is bounded between the outer and inner flange side surfaces. The recessed portion 123 is in the form of a cutout formed by cutting off the apex formed by the flange end surface 121a, the flange inner side surface and the cylinder head bottom surface 12a.

Head recessed portion 123 is located at a position confronting the corresponding block recessed portion 113 vertically across sheet gasket G. Sheet gasket G includes a corner portion G1 projecting into a hollow space formed between the block recessed portion 113 and head recessed portion 123, as shown in FIG. 4. In this example, the width Wc of the block recessed portion 113 is smaller than or equal to the width We of the cover recessed (chamfered) portion 1912 so as to increase the width of a flat metal touch portion (that is, the parallel overlap portion between a flat metal surface and a flat metal surface) of the flat portion 1911 and flange end surface 111a, and improve the sealing performance. Similarly, the width Wc of the head recessed portion 123 is smaller than or equal to the width We of the cover recessed (chamfered) portion 1912. The corner portion G1 of sheet gasket G projects into the space formed by the block recessed portion 113 and the space formed by the head recessed portion 123. However, the projecting corner portion G1 of sheet gasket G does not reach front cover 19. As shown in FIG. 2, in this example, the length L2 of the projecting gasket portion G1 is smaller than the depth L1 of recessed portions 113 and 123 which are set equal in the depth measured in the longitudinal direction of the engine block.

On each of the left and right sides, the recessed portions 113 and 123 of cylinder block and head 11 and 12 and recessed portion 1912 of front cover 19 are all formed on the inner side toward an imaginary median plane bisecting the engine block (11 and 12) and the front cover 19 into left and right halves. The recessed portion 1912 of front cover 19 extends vertically and forms a vertical hollow portion or zone extending vertically from an upper segment confronting cylinder head 12 to a lower segment confronting cylinder block 11. Recessed portions 113 and 123 of cylinder block and head 11 and 12 define a small space or chamber which extends forwards in the longitudinal direction of the engine block, and thereby opens into an intermediate portion of the vertically extending hollow portion formed by the recessed portion 1912 of front cover 19.

However, it is optional to form these recessed portions 113, 123 and 1912 on the outer side. In this case, the collector portion p1 is opened in the left or right outer side surface of the engine block. Accordingly, this arrangement on the outer side can increase the area of the collector portion p1 bared to the outside air, and thereby promote the hardening of liquid gasket g in the collector portion p1. Moreover, when the time for hardening liquid gasket g is not problematical (because there is provided means for ensuring the contact with the outside air, for example), it is possible to form the recessed portions 113 and 123 in an intermediate position in the flange widthwise direction W between the outer and inner flange side surfaces.

Front cover 19 of this example has a U-shaped cross section like a channel bar, and includes a plate-like main portion and left and right cover flanges 191 projecting rearwards toward the engine block, respectively, from the left and right ends of the main portion. Each cover flange 191 has a flange end surface 191a (serving as a fifth joint surface), and outer and inner flange side surfaces which are flat and parallel to each other in this example and which terminate at respective rear ends between which the flange end surface 191a extends in the flange widthwise direction. Front cover 19 is joined to the engine block composed of cylinder block 11 and cylinder head 12 by fastening devices such as bolts 62 (only one is shown schematically in FIG. 1) through liquid gasket g. In the assembled state, each cover flange 191 is connected end to end with the corresponding block flange 111 and head flange 121. The liquid gasket g is interposed between the cover flange end surface 191a, and the flange end surfaces 111a and 121a of cylinder flange 111 and head flange 121.

Figure 5A:
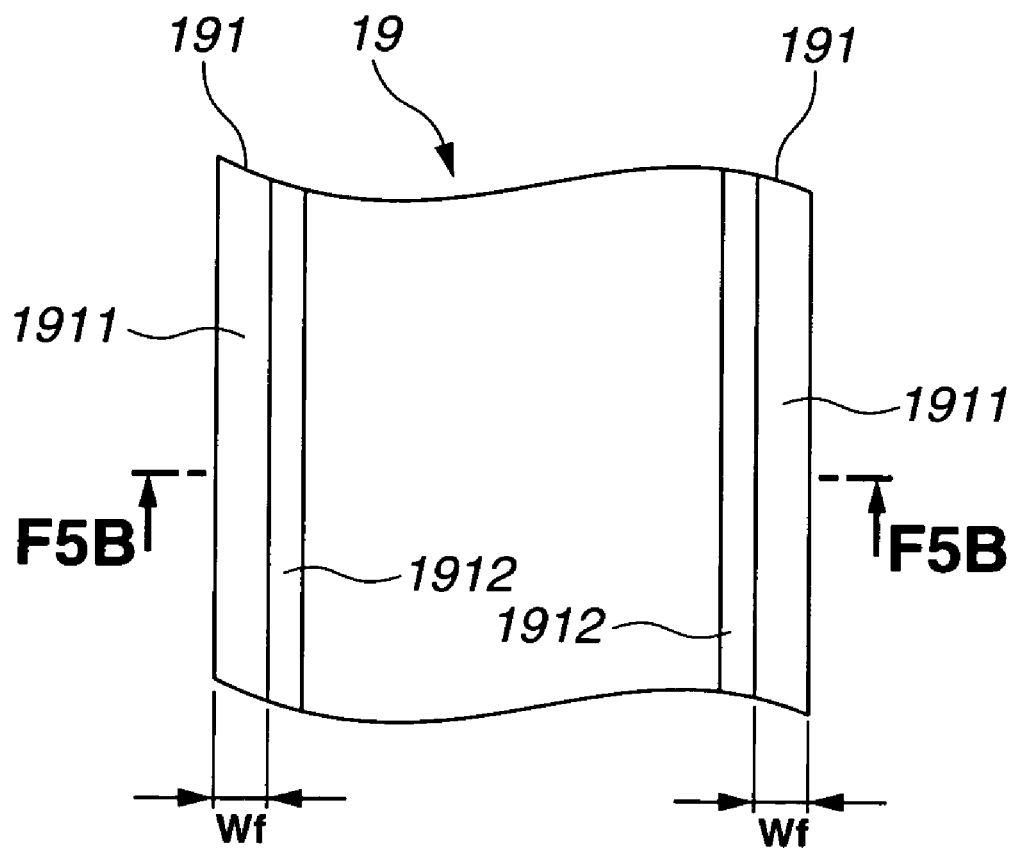
FIG. 5A is a view showing the front cover of FIG. 3 as viewed from an engine block's side.
Figure 5B:
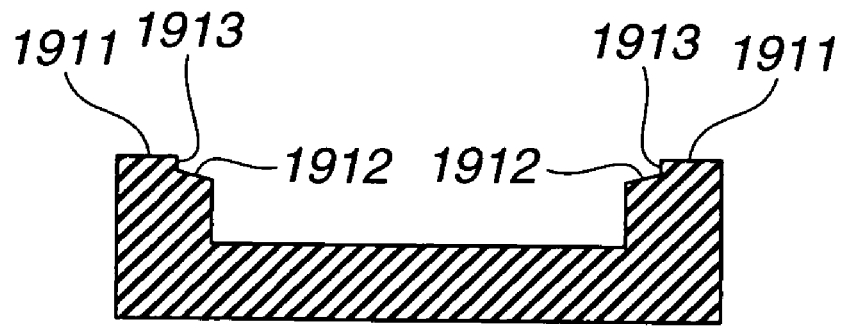
FIG. 5B is a sectional view taken across a line F5B-F5B shown in FIG. 5A.

FIG. 5A shows front cover 19 as viewed from the rear side or the engine block's side. FIG. 5B is a sectional view taken across a line 5B-5B shown in FIG. 5A. As shown in these figures, the projecting end of each cover flange 191 is chamfered, and the flange end surface 191a of each cover flange 191 includes a flat region or portion 1911 and the above-mentioned recessed or chamfered portion 1912 extending side by side vertically. Flat portion 1911 confronts the corresponding flat flange end surfaces of block flange 111 and head flange 121. The vertical direction and the lateral direction of the engine block are parallel to the flat portion 1911. The longitudinal direction of the engine block is perpendicular to the flat portion 1911. In this example, the flat portion 1911 of each cover flange 191 is located on the outer side and bounded by the outer flange side surface. Flat portion 1911 extends from the outer end of cover flange 191 toward the inner end. Flat portion 1911 has a width Wf as shown in FIG. 5A. Recessed portion 1912 is located on the inner side of the cover flange between the flat portion 1911 and the flange inner side surface facing toward the flange inner side surface on the opposite side across an imaginary median plane bisecting front cover 19 into left and right halves. In this example, recessed portion 1912 is defined by a sloping or slant flat surface sloping from the inner end of the flat portion 1911, to the flange inner side surface so that the spacing from the flange end surfaces 111a and 121a of the corresponding block and cylinder flanges 111 and 121 increases gradually toward the flange inner side surface of the cover flange 1911. A flat step surface 1913 extends between the inner end of the flat portion 1911 and the outer end of the sloping surface, in the longitudinal direction of the engine block or in parallel to the outer and inner flange side surfaces. The thus-shaped recessed or chamfered portion 1912 of each cover flange 191 extends vertically and forms a vertically extending collector portion p2 in which the liquid gasket g is collected. This collector portion p2 is formed between the recessed portion 1912 of each cover flange 191 and the flat flange end surfaces of the corresponding block flange 111 and head flange 121. The step surface 1913 may be inclined so that the angle between the flat portion 1911 and the flat step surface 1913 is equal to an obtuse angle, and that the inclination of the step surface 1913 is sharper than the inclination of the sloping surface, and the step surface 1913 forms a concave angle with the sloping surface. However, it is preferable to orient the step surface so that the step surface is perpendicular to the flat portion 111.

Figure 8:
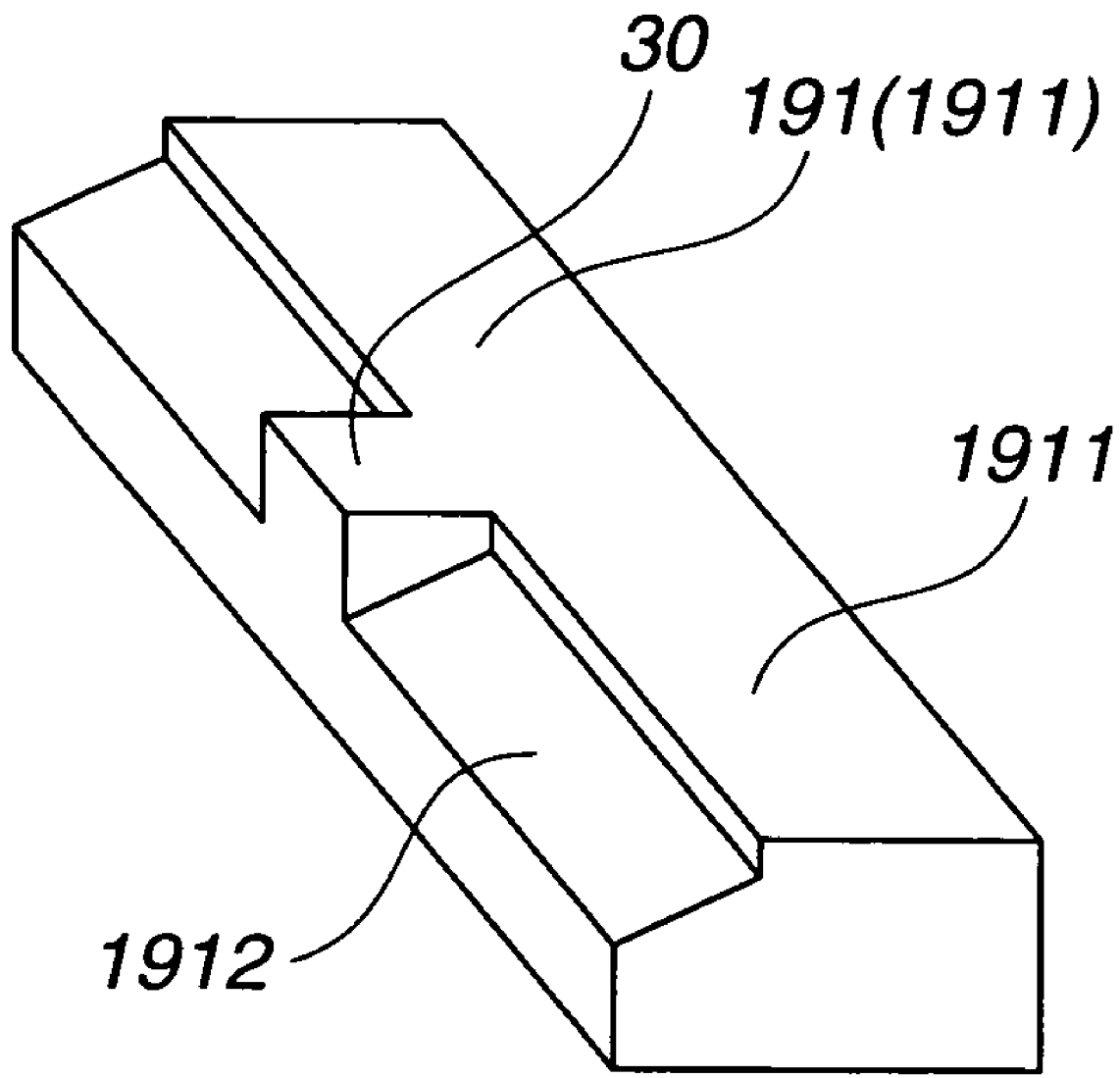
FIG. 8 is a schematic perspective view showing a flange of the front cover.

FIG. 8 schematically shows one cover flange 1911. As shown in FIG. 8 and FIG. 2, cover flange 1911 includes a projecting portion 30 projecting from the sloping surface of the recessed portion 1912, rearwards toward the space formed by the block recessed portion 113 and head recessed portion 123 of the corresponding block and head flanges 111 and 121. The projecting portion 30 includes a flat end surface which is even, flush and continuous with the flat portion 1911 in the example shown in FIG. 8. In other words, the flat portion 1911 projects in the form of the projecting portion 30 to the flange inner side surface, and the vertically extending recessed portion 1912 is discontinued and divided by the projecting portion 30, into an upper recessed segment extending upwards from projecting portion 30 and a lower recessed segment extending downwards from projecting portion 30. The sheet gasket G of this example includes a bead 32 in the form of a ridge or projection, extending in the longitudinal direction between the corresponding block flange 111 and head flange 121, and thereby forms a seal line alongside the outer flange side surfaces of block flange 111 and head flange 121. This bead 32 extends straight toward the flat portion 1911 of the corresponding cover flange 191 so that the longitudinal direction of the bead 32 intersects the flat portion 1911 at right angles.

In the assembled state shown in FIG. 2, there is formed an upper gap 31 through which the collector portion p1 formed by the block recessed portion 113 and head recessed portion 123 is connected with the upper segment of the collector portion p2 formed between the cover recessed portion 1912 and the flange end surface 121a above the projecting portion 30, and a lower gap 31 through which the collector portion p1 is connected with the lower segment of the collector portion p2 formed between the cover recessed portion 1912 and the block flange end surface 11a below the projecting portion 30. Accordingly, the length or height L3 of projecting portion 30 is shorter than the length or height L4 of the space formed by the block and head recessed portions 113 and 123.

Figure 6A:
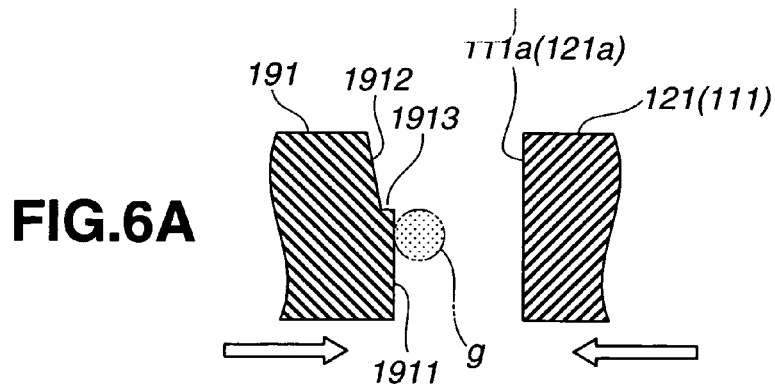
FIGS. 6A and 6B are views illustrating behavior of liquid gasket into a chamfered portion of the front cover during an assembly operation of the front cover.
Figure 6B:
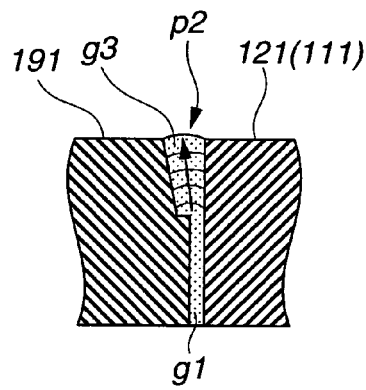
Figure 7A:
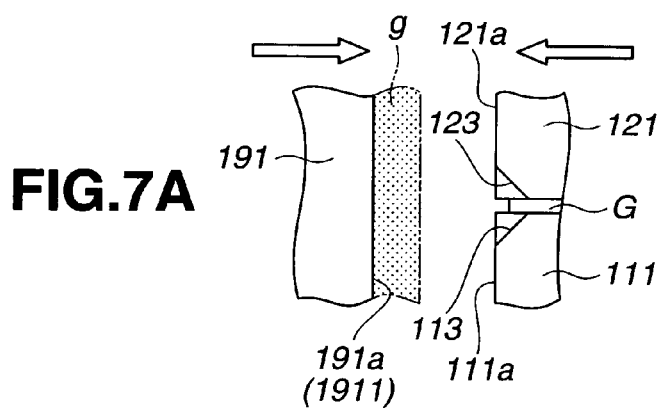
FIGS. 7A and 7B are views illustrating behavior of liquid gasket into recessed portions of the cylinder block and cylinder head during an assembly operation of the front cover.
Figure 7B:
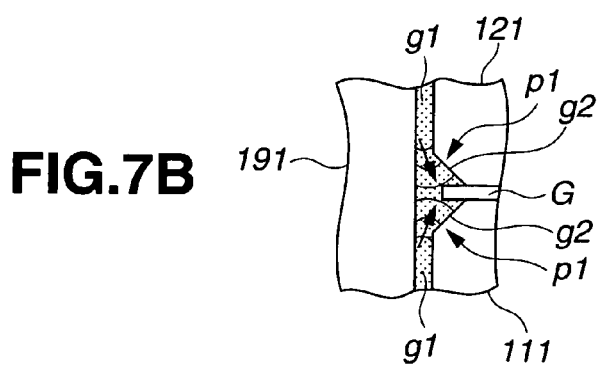

FIGS. 6A, 6B, 7A and 7B illustrate the liquid gasket g in the assembly process of the cylinder block 11, cylinder head 12 and front cover 19. FIGS. 6A and 6B show behavior of liquid gasket g between one cover flange end surface 191a and the corresponding block flange end surface 11a (or head flange end surface 121a) in the form of a cross section as viewed from above. FIGS. 7A and 7B show behavior of liquid gasket g between one cover flange end surface 191a and the corresponding block and head recessed portions 113 and 123 (in the joint portion A).

As shown in FIGS. 6A and 7B, liquid gasket g which is not yet hard is applied to the inner end portion of flat portion 1911 of cover flange 191 adjacent to the step surface 1913. In this case, the step surface 1913 can serve as a target or reference position in an operation of applying liquid gasket g, and thereby make it easier to apply liquid gasket g at a correct position. Then, the flange end surface 191a of cover flange 1901 and the flange end surfaces 111a and 121a of the corresponding block flange 111 and head flange 121 are moved toward each other gradually, and attached to each other, and the cover flange 191 and the block and head flanges 111 and 121 are fastened end to end by bolts 61. During this, the liquid gasket g is pressed between the confronting flange end surfaces, and spread in the collector portion p2 so that the liquid gasket g fills the interspace between the confronting flange end surfaces, as shown in FIGS. 6B and 7B.

As shown in FIGS. 6B and 7B, the liquid gasket g forms a layer between the flat flange end surfaces of front cover 19 and the engine block. Moreover, the liquid gasket g is readily collected in a larger quantity in the collector portions p1 and p2. The collector portion p1 is connected with collector portion p2 through gaps 31, so that liquid gasket g can flow therebetween smoothly.

In the example shown in FIG. 2, the portion G1 of the sheet gasket G projects in the space formed between block recessed portion 113 and head recessed portion 123, and the projecting portion 30 projects toward the projection G1 of sheet gasket G to the extent not preventing smooth flow of liquid gasket g up and down through the gap formed between the projecting portion 30 and the sheet gasket G. Accordingly, the liquid gasket g can be readily filled on both sides of the projecting portion G1 of sheet gasket G.

After the fastening operation, the liquid gasket g is made hard by leaving for a predetermined time interval for drying. The hardened liquid gasket g forms a gasket layer including a thin film layer g1 formed between the flat portion 1911 of each cover flange 191 and the flat flange end surfaces 111a and 121a of block flange 111 and head flanges 121; and swell portions g2 and g3 formed, respectively, in collector portions p1 and p2, and connected continuously with the thin film layer g1. The swell portion g3 bulges like a ridge and extending vertically in the chamfered portion 1912.

In the thus-constructed structure, the chamfered portion 1912 is formed only on one side along one side edge of the fifth joint surface in the form of the flange end surface 191a, alongside the flat portion 1911. Accordingly, the chamfered portion on each side defines the liquid gasket collector portion p2, and thereby makes it possible to reduce the required time for drying the liquid gasket g by exposing the soft liquid gasket to the outside air. The swell portions g2 and g3 are formed only on one side. Accordingly, the liquid gasket can improve the withstanding strength and the sealing performance between cylinder block 11 and front cover 19 and between cylinder head 12 and front cover 19.

Stress (tensile stress and shearing stress) is produced in the liquid gasket g when front cover 19 and cylinder block 11 are shifted relative to each other or front cover 19 and cylinder head 12 are shifted relative to each other. The seal member produced by the hardened liquid gasket can be shaped so as to eliminate an angled corner liable to suffer stress concentration. Moreover, the swell portions g2 and g3 are formed at a position at which stress concentration tends to occur. Therefore, the swell portions can function to disperse stress concentration therein, and thereby improve the durability specifically against damage such as cracking, and the sealing performance of the seal or gasket.

Recessed portions 113 and 123 are formed at a T-shaped junction between the joint interface between cylinder block 11 and cylinder 12, and the joint interface between front cover 19 and the engine block which is a subassembly of cylinder block 11 and cylinder head 12. The thus-formed recessed portions 113 and 123 make it easier to fill the space at the T-shaped junction with the liquid gasket g smoothly, and to make the swell portions of the liquid gasket filled up in the collector portions p1 and p2.

Recessed portions 113 and 123 are formed on the same side as the chamfered portion 1912 in the widthwise direction W, and arranged to confront the chamfered portion 1912. Accordingly, the widthwise dimension of the surface contact area between the flat region 1911 of front cover 19 and the flat flange end surfaces 111a and 121a of cylinder block 11 and cylinder head 12 is increased as compared to the arrangement in which recessed portions 113 and 123 are formed on the other side away from chamfered portion 1912. Therefore, the sealing effect is improved.

Part of the sheet gasket G is designed to project into the space formed in recessed portions 113 and 123. Therefore, the liquid gasket g and sheet gasket G are lapped reliably. The projecting end portion of sheet gasket G is inserted and buried in the hardened liquid gasket g. Therefore, sheet gasket G and liquid gasket g are securely united into a T-shaped seal member which can improve the sealing performance significantly.

Chamfered portion 1912 and recessed portions 113 and 123 are formed on the inner side in the widthwise direction W, that is on the inner side with respect to a leaking direction F1 of lubricating oil as shown in FIG. 4. Therefore, the seal member on the inner side can prevent the leakage of oil more reliably as compared to the arrangement having a liquid gasket portion on the outer side of the leaking direction. Moreover, the arrangement having the chamfered and recess portions on the inner side can prevent the liquid gasket from protruding outsides or dropping.

In flange end surface 191a of each cover flange 1911, the step surface 1913 is formed between the flat region 1911 and the sloping surface. This step surface 1913 makes it easier to produce the flat region and the sloping surface accurately to meet the respective requirements of the accuracy without interference from each other. Therefore, it is possible to decrease the product by product nonuniformity, and to produce the seal structure accurately and reliably.

The projecting portion or projection 30 projects toward the recessed portions 113 and 123. Therefore, the liquid gasket g can readily flow, from below and from above as shown by arrows in FIG. 7B, into recessed portion 113 and into recessed portion 123. Moreover, the sloping surface can serve as a guide for leading the liquid gasket g into the deepest portion of the recessed portion. Therefore, the projecting end portion G1 of sheet gasket G can be tightly enclosed and buried in the liquid gasket on both sides of sheet gasket G.

Projection 30 has the flat end surface flush with the flat portion 1911. Accordingly, projection 30 increases the width of the flat joint surface partly. Thereby, projection 30 can support the pressure efficiently during the joining operation, and prevent undesired flow of the not-yet-hardened liquid gasket g.

Chamfered portion 1912 and recessed portions 113 and 123 are formed on the same side in the widthwise direction W. This arrangement makes it easier to set the bead 32 of sheet gasket G at the correct position confronting the flat portion 1911 without the need for further increasing the width of the contact area.

The present invention is not limited to the embodiment illustrated and described above. Various modifications and variations are possible within the scope of the present invention. In the preceding embodiment, the three main members of the seal structure (at A shown in FIG. 1) are cylinder block 11, cylinder head 12 and front cover 19. However, the seal structure according to the present invention may be a structure shown at B in FIG. 1 including, as the main three members, cylinder block 11, upper oil pan 16 and front cover 19; or may be a structure shown at C in FIG. 1 including, as the three main member, cylinder block 11, upper oil pan 16 and a rear oil seal retainer 21. Rear oil seal retainer 21 is a member for supporting, fixedly on the engine 1, an oil seal for sealing the inside of the crankcase from the outside.

Figure 9:
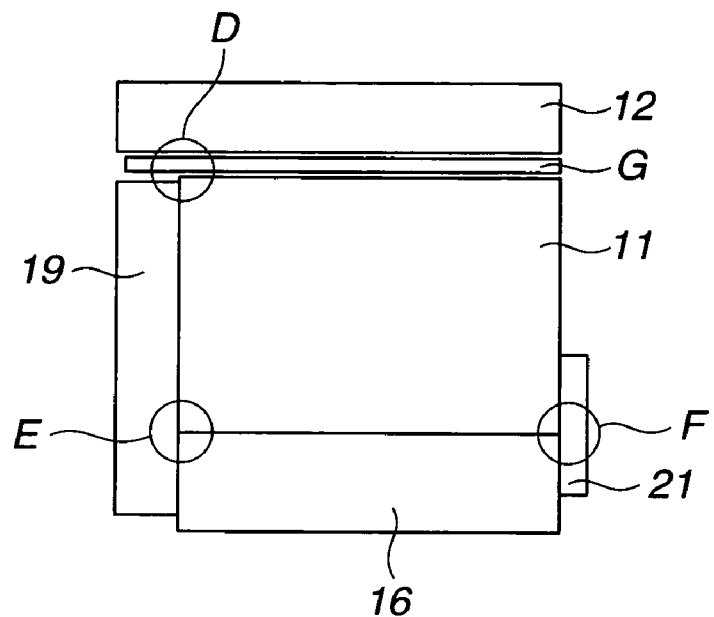
FIG. 9 is a schematic view showing an engine of another type to which the present invention can be applied.

Moreover, engine 1 may be of a type shown in FIG. 9. In the engine shown in FIG. 9, a cylinder head 12 is fixed to the top of a front cover 19, as well as to the top of a cylinder block 11. The seal structure according to the present invention can be applied to any one or more of a D portion, an E portion and an F portion of the engine shown in FIG. 9.

Figure 10A:
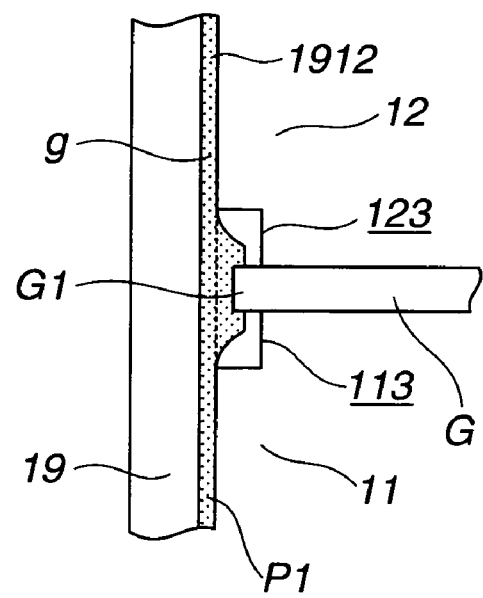
FIGS. 10A and 10B are views for illustrating a variation of the arrangement of FIG. 2 in which a projection 30 shown in FIG. 2 is eliminated.
Figure 10B:
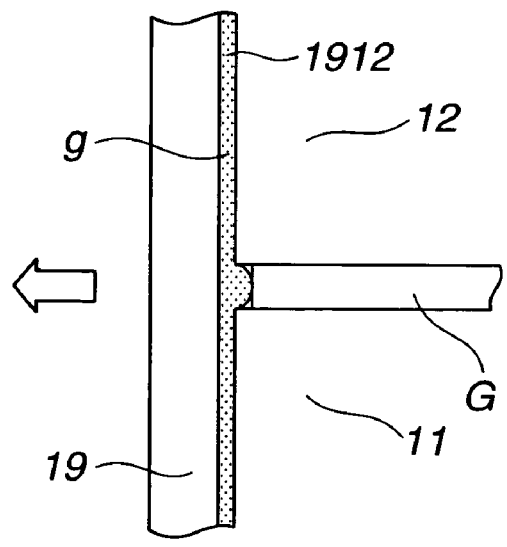

As shown in FIG. 10A, it is optional to eliminate the projecting portion 30 (shown in FIG. 2). In this case, chamfered portion 1912 extends plainly without being discontinued by the projection 30. In this case, too, the sealing effect is improved because liquid gasket g can flow smoothly on both sides of sheet gasket G by the aid of the recessed portions (113, 123), by contrast to a comparative example shown in FIG. 10B having no recessed portions.

Sheet gasket G between cylinder block 11 and cylinder head 12 may be replaced by a layer of liquid gasket g. In this case, liquid gasket g is pressed between the cylinder block top surface 11a and the cylinder head bottom surface 12a, and introduced into the collector portion p1 smoothly.

In the illustrated embodiment, recessed portion 113 or 123 is formed in each of the block flange 111 and head flange 121. However, it is optional to employ an arrangement in which a recessed portion 113 or 123 is formed only in either of the block flange 111 and head flange 121.

The seal structure according to the present invention can be applied to various machines and structures, specifically to oil seal portions, as well as to engines.

In this specification, geometrical terms such as flat, parallel, perpendicular, vertical or horizontal are used to contain a meaning of "exactly or approximately". For example, "flat" means "exactly or approximately flat" or "substantially flat".

This application is based on a prior Japanese Patent Application No. 2005-65350 filed on Mar. 9, 2005. The entire contents of this Japanese Patent Application No. 2005-65350 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seal structure comprising:
   a first member including a first joint surface and a flat third joint surface forming a corner with the first joint surface;
   a second member joined with the first member, the second member including a second joint surface joined with the first joint surface of the first member, a flat fourth joint surface forming a corner with the second joint surface, and a recessed portion formed in the corner between the second and fourth joint surfaces; and
   a third member joined with the first and second members, the third member including a fifth joint surface joined, through a liquid seal, with the flat third joint surface of the first member and the flat fourth joint surface of the second member, the fifth joint surface including a flat region and a chamfered region which is recessed from the flat region of the fifth joint surface and which confronts the recessed portion of the second member, the fifth joint surface extending from a first lateral edge to a second lateral edge in a widthwise direction which is perpendicular to a joining direction of the fifth joint surface with the third and fourth joint surfaces, the chamfered region being formed along one of the first and second lateral edges,
   wherein the third member further includes a projecting portion projecting from the chamfered region of the third member toward a space formed by the recessed portion of the second member,
   wherein the first member includes a recessed portion formed in the corner between the first and third joint surfaces, and
   wherein a length of the projecting portion is smaller than a length of a space formed by the recessed portion of the first member and the recessed portion of the second member.

2. The seal structure as claimed in claim 1, wherein the seal structure further comprises a sheet gasket interposed between the first joint surface of the first member and the second joint surface of the second member, and the sheet gasket includes a projecting portion projecting in the recessed portion of the second member.

3. The seal structure as claimed in claim 2, wherein the sheet gasket includes a bead extending to the flat region of the fifth joint surface of the third member.

4. The seal structure as claimed in claim 1, wherein the projecting portion of the third member has a flat end surface which is flush with the flat region of the fifth joint surface.

5. The seal structure as claimed in claim 1, wherein the third member includes an outside surface, and the chamfered region of the third member is located on an inner side of the flat region so that the flat region is located between the outside surface of the third member and the chamfered region.

6. The seal structure as claimed in claim 1, wherein one of the first and second members is a cylinder block of an internal combustion engine, and the other of the first and second member is a cylinder head of the engine, and the third member is a cover member covering ends of the cylinder block and the cylinder head.

7. The seal structure as claimed in claim 1, wherein the seal structure further comprises a hardened liquid gasket layer including a thin layer formed between the flat region of the fifth joint surface of the third member and the flat third and fourth joint surfaces of the first and second members, a first swell portion bulging from the thin layer into the recessed portion of the second member; and a second swell portion bulging from the thin layer into the chamfered region of the third member.

8. The seal structure as claimed in claim 1, wherein the first member includes a first flange projecting toward the third member and terminating at the flat third joint surface; the second member includes a second flange projecting toward the third member and terminating at the flat third joint surface; wherein the third member is joined to the first flange of the first member and the second flange of the second member; and wherein the third member includes a third flange projecting toward the first and second members and includes, as a flange end surface, the fifth joint surface.

9. The seal structure as claimed in claim 1, wherein the first and second joint surfaces of the first and second members confront each other in a first joining direction distinguished from a second joining direction which is a joining direction of the fifth joint surface with the third and fourth joint surfaces; the fifth joint surface of the third member extends in the first joining direction along the third joint surface of the first member and the fourth joint surface of the second member which are flush with each other, and extends in the widthwise direction from the first lateral edge to the second lateral edge of the fifth joint surface; the recessed portion of the second member is recessed in a first direction away from the fifth joint surface of the third member; and the chamfered region is formed along the second lateral edge, and recessed in a second direction away from the third and fourth joint surfaces of the first and second members.

10. The seal structure as claimed in claim 9, wherein the widthwise direction is substantially perpendicular to the first joining direction, and the first and second directions are substantially perpendicular to the first joining direction and to the widthwise direction.

11. The seal structure as claimed in claim 9, wherein the first and second members are joined by first fastening devices extending in the first joining direction, and the third member is joined to the first and second members by second fastening devices extending in the second joining direction perpendicular to the first joining direction.

12. The seal structure as claimed in claim 1, further comprising:
a seal member including:
a first seal section which is interposed between the first and second joint surfaces of the first and second members, a second seal section extending along the fifth joint surface and including a first segment interposed between the fifth joint surface and the third joint surface of the first member, a second segment interposed between the fifth joint surface and the fourth joint surface of the second member, and an intermediate portion located between the first and second segments, and
a third seal section bulging from the intermediate portion of the second seal section, and connecting with the first seal section, the second and third seal sections are made of the liquid seal.

13. The seal structure as claimed in claim 12, wherein the first seal section includes an end portion buried in the third seal section; wherein the third seal section includes a portion filling a recessed portion formed in at least one of the first, second and third members; wherein the first seal section includes a solid sheet gasket; wherein the first seal section includes a ridge extending in a first direction to form a seal line between the first and second joint surfaces; and the second seal section includes a ridge extending along the fifth joint surface of the third member; and wherein each of the first, second and third members is a metallic member.

14. The seal structure as claimed in claim 1, wherein the third member includes: first and second opposite side surfaces spaced from each other in the widthwise direction; an angled edge formed between the flat region of the fifth joint surface and the first side surface; and a chamfered edge formed between the fifth joint surface and the second side surface by the chamfered region which includes a slant surface extending obliquely so as to bevel an angled edge between the fifth joint surface and the second side surface and thereby to form the chamfered edge.

15. The seal structure as claimed in claim 1, wherein the projecting portion of the third member divides the chamfered region into a first chamfered segment extending from the projecting portion along the third joint surface of the first member and a second chamfered segment extending from the projecting portion along the fourth joint surface of the second member.

16. The seal structure as claimed in claim 1, wherein the projecting portion is integrally formed with the third member.

17. The seal structure as claimed in claim 1, wherein the length of the projecting portion is smaller than the length of the space formed by the recessed portion of the first member and the recessed portion of the second member such that the projecting portion does not abut the first and second members.

* * * * *